United States Patent [19]
Adachi

[11] Patent Number: 5,245,402
[45] Date of Patent: Sep. 14, 1993

[54] GENERAL ASPHERICAL SURFACE OPTICAL TESTING DEVICE
[75] Inventor: Iwao P. Adachi, Westminster, Calif.
[73] Assignee: The United States of America as represented by the Secretary of the Army, Washington, D.C.
[21] Appl. No.: 901,622
[22] Filed: Jun. 15, 1992
[51] Int. Cl.[5] ............................................. G01B 9/00
[52] U.S. Cl. .................................................. 356/124
[58] Field of Search ................ 356/124, 127, 359, 360

[56] References Cited
U.S. PATENT DOCUMENTS

| | | | |
|---|---|---|---|
| 4,523,842 | 6/1985 | Allen et al. | 356/124 |
| 4,818,108 | 4/1989 | Eppinger | 356/124 |

FOREIGN PATENT DOCUMENTS

| | | | |
|---|---|---|---|
| 491912 | 2/1976 | U.S.S.R. | 356/124 |
| 1397724 | 5/1988 | U.S.S.R. | 356/124 |

OTHER PUBLICATIONS

MacGovern et al. Applied Optics, vol. 10, No. 3, Mar. 1971, pp. 619–624.
"Optical Shop Testing", edited by Daniel Malacara, Published by John Wiley and Sons, New York/Chichester/Brisbane/Toronto, pp. 455–558 and 515–516.
"Obtaining Aspherical Wave Fronts With Computer Holograms", by M. A. Golub et al. and translated in Soviet Physics–Doklady, vol. 25, No. 8, pp. 627–629, Aug. 1980.
"Phase Quantization and Discretization in Diffractive Optics", by M. A. Golub et al., 188/SPIE, vol. 1334, Current Developments in Optical Engineering IV '90.
"An Interferometer for Testing of General Aspherics Using Computer Generated Holograms", by Steven M. Arnold et al, SPIE vol. 1396 Applications of Optical Engineering: Proceedings of OE/Midwest 1990/pp. 473–480.

Primary Examiner—F. L. Evans
Attorney, Agent, or Firm—Hugh P. Nicholson; Freddie M. Bush

[57] ABSTRACT

A general aspherical surface optical testing device comprised of a collimator lens system having lens designed to a predetermined radius of curvature that perfectly collimates a focused laser beam through an aberration compensating lens. The aberration compensating lens is designed to a predetermined radius of curvature to compensate for the aberration of an ellipse mirror, a parabola, or hyperbola mirror. A computer generated holographic general aspheric compensating plate is positioned between the collimator and the aberration compensating lens to make additional correction as needed in addition to the aberration compensations lens. For an aspheric mirror having a large numerical aperture, the hologram is order type.

5 Claims, 2 Drawing Sheets

GENERAL ASPHERICAL SURFACE OPTICAL TESTING DEVICE

DEDICATORY CLAUSE

The invention described herein was made in the course of or under a contract or subcontract thereunder with the Government; therefore, the invention described herein may be manufactured, used, and licensed by or for the Government for governmental purposes without the payment to me of any royalties thereon.

BACKGROUND OF THE INVENTION

This invention relates to general aspherical surface optical testing; i.e., optical surface that departs significantly from the spherical form.

A perfectly spherical surface as determined by exact calculations can never form a perfect image of finite object by either reflecting or refracting. The described defect which is caused by the geometry of a spherical surface is known as spherical aberration. The rays of light which make the largest angle with the optical axis will be the most influenced by this defect. Spherical aberration may be reduced by use of aspheric surfaces or, in the case of multiple element systems, by taking advantage of a counteracting effect based on errors inherent to each of the different surfaces. The reduction of spherical aberration of an acceptable amount is one of the first problems of the optical designer.

The testing of a concave mirror or a lens has evolved with improvements over the years. An earlier method of testing curved mirrors or lens is known as the Foucault knife-edge test which includes placing a pinhole-source of light at infinite distance behind the lens or at the center of curvature of the mirror (or as near the center as possible). The eye placed at the image of the pinhole should see the entire lens or mirror illuminated. A knife-edge moved across the image immediately in front of the eye will determine where the image is located and will show defects in the lens or mirror by irregular darkening of the image. This test was employed as a customary test by amateur telescope-mirror makers.

Another test method known as the Ronchi test is considered an improved method over the Foucault knife-edge test for testing curved mirrors. The Ronchi test for testing curved mirrors is to replace the knife-edge with a transmission grating, having 40-200 lines to the inch, and to replace the pinhole source with a slit or a section of the same grating.

Mirror and optical surface technology and improvements directed to testing for surface imperfections have been enhanced by laser research and the need for improved mirrors of large diameters for space explorations and continued research and development.

A procedure for testing large diameter mirrors is very expensive, particularly for testing mirrors that depart significantly from a spherical form. These types of mirrors are referred to as aspherical mirrors. As examples, for testing an aspherical mirror of 40 inch diameter with a focal point equal to the diameter of the mirror, the testing with aid of Hindle sphere requires a set up and operation which is very costly. A Hindle sphere is constructed for each type of curved surface to be tested, for example, a parabola shaped mirror requires a 40 inch diameter Hindle sphere of the flat type. A 40 inch diameter hyperbola shaped mirror requires a 45 inch diameter Hindle sphere of the sphere type whereas a 40 inch diameter ellipse shaped mirror requires a 38 inch diameter Hindle sphere also of the sphere type. These methods are not able to test general aspheric mirrors.

Desirable would be an inexpensive device for testing general aspheric mirrors. While conic curves, parabola, hyberb and elipses are expressed by $x^2$ terms like $z*a \times x^2$ and $z = x^2/b + y^2/c$, the general aspheric surface includes higher order terms like $x^4$, $x^6$, and even $x^8$.

Therefore, an object of this invention is to provide a general aspherical surface optical testing device.

A further object of this invention is to provide a general aspherical surface optical testing device which employs a laser as the illuminating source.

SUMMARY OF THE INVENTION

The general aspherical surface optical testing device comprises a collimator lens system having lens designed to a predetermined radius of curvature that perfectly collimates a focused laser beam from an illuminating light from a laser source. The collimated laser beam is directed through an aberration compensating lens consisting of all spherical elements of plano convex and meniscus lens. The aberration compensating lens is designed to a predetermined radius of curvature to compensate the aberration of an ellipse mirror whereby the combined system is free from spherical aberration. An aberration compensating lens is designed by the same principle for parabola or hyperbola. Thus, the aspherical surface of conic curve can be tested with a compensating lens made of simple lens consisting of all spherical surfaces. However, the requirements of a general aspheric mirror indicates that the aberration compensating lens is inadequate, but a correcting element is required in addition. Thus, a computer generated holographic general aspheric compensating plate is provided which is positioned between the collimator and the aberration compensating lens to make additional corrections needed in addition to the aberration compensations lens. For aspheric mirror having a large numerical aperture, the hologram is 0 order type. The higher order diffracted laser beam is eliminated by a spatial filter located at focusing point. The return image is tested by Ronchi test or an interferometric test for final confirmation. The LUPI test is a well known in optical testing and light interferometry. The acronym LUPI stands for Laser Unequal Path Interferometer

DESCRIPTION OF THE PREFERRED EMBODIMENT

Figure 1:
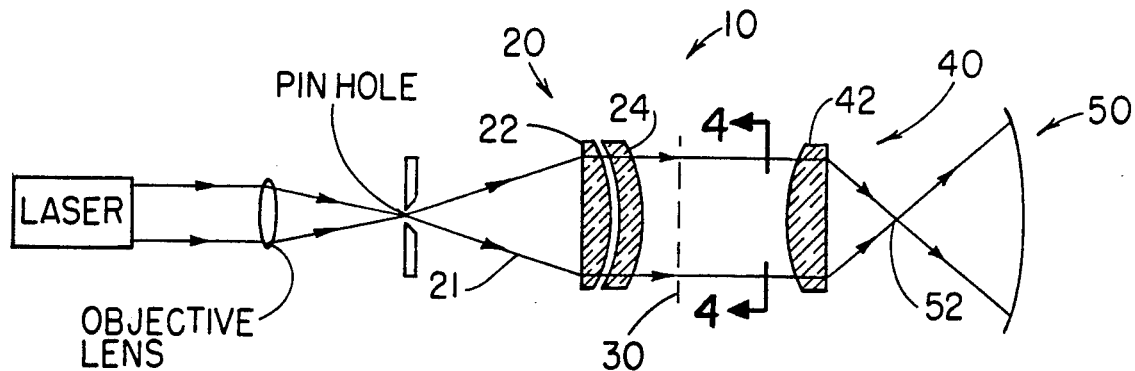
FIG. 1 depicts the general aspherical surface optical testing device in accordance with this invention.

The general aspherical surface optical testing device as depicted in FIG. 1 comprises a collimator for perfectly collimating a laser beam from a laser source, and in combination with an aberration compensating lens and having a computer generated holographic general aspheric compensating plate disposed therebetween in a collimated beam. In between the laser and the collimating lens, a small lens such as a microscope objective, focuses the laser light on the pinhole, and the laser light emerges from the pinhole diverges until it reaches the collimating lens. The computer generated holographic general aspheric compensating plate corrects residual aberrations remaining from aberration compensating spherical surface lens function in said general aspherical surface optical testing device.

In further reference to FIG. 1 the collimator 20 comprises in combination a plano convex lens 22 and convexo concave lens 24.

The aberration compensating lens 40 of FIG. 1 requires designs based on the use of simple lens. For example, the aberration compensating lens 40 is comprised of all spherical elements consisting of plano convex and meniscus lens. For ellipse mirror testing, the lens 40 is designed to compensate for the aberrations of the ellipse mirror being tested and the combined system is free from spherical aberrations. The same principle is employed for parabola or hyperbola. Thus, the aspherical surface of conic curve is tested by compensating lens made of simple lens consisting of all spherical surfaces. When testing a general aspheric mirror 50, a need for further compensation of aberrations is required. This brings in to play the computer generated holographic general aspheric compensating plate 30 of FIG. 1 which is positioned in the collimated beam between collimator 20 and aberration compensating lens 40.

When the mirror to be tested has a large numerical aperture, the hologram is 0 order type. Generally, a lens combination, zero power, when introduced into an optical system makes no essential change in the principal focal plane, but does reduce certain aberrations, particularly spherical aberration. The higher order diffracted beam is eliminated by a spatial filter 52 located at the focusing point.

The glossary set forth hereinbelow provides an easy reference for abbreviations or symbols used in the collimator lens specifications of Examples I and III below.

Figure 2:
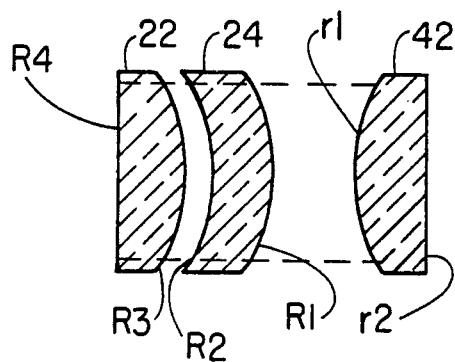
FIG. 2 depicts design of lenses 22, 24, and 42 of FIG. 1 with respect to radii of curvatures R or r and relevant distances between optical surfaces measured at centers of lenses of Examples I and III.

GLOSSARY $R_n$ or $r_n$ = radius of curvature, wherein n is a whole integer designating an optical surface;
$d_n$ = distance between optical surfaces of lens, curved or flat measured at center of lens, wherein n is a whole integer;
f1 = focal length;
bf = back focal length;
w = wavefront aberration
hm = maximum height
BK7 = optical grade glass In further reference to FIG. 2 and Examples I and III, wherein the "d" distances are the distances between the lens surfaces measured at the center of the lens. For Example I, the respective distances between R1 and R2 = d1 = 11 mm, between R2 and R3 is 1 mm, and between R3 and R4 is 11 mm. Likewise, in Example III, the distance between r1 and r2 is d1 = 0.710".

The characteristics of the collimator lens 20 of FIG. 1 are set forth below under Example I.

EXAMPLE I

COLLIMATOR LENS SPECIFICATIONS

R1 = 299 mm

| | | |
|---|---|---|
| | d1 = 11 | BK7 Diameter = 140 mm |
| R2 = 242 | | |
| | d2 = 1 | Air |
| R3 = 299 | | |
| | d3 = 11 | BK7 Diameter = 140 |
| R4 = flat | | |
| f1 = 754.7 mm, bf = 738.23 mm, w = 0.0001 mm | | |
| hm = 63 mm, f/6 NA (numerical aperture) = 0.0834 | | |

*Optical grade glass

BK7 is an optical grade glass whose composition, and fabrication technique are well known as disclosed in Journal of Lightwave Technology, Vol. 7, No. 10, October 1989, pages 1590-1596, "Low—Loss Small—Mode Passive Waveguides and Near-Adiabatic Tapers in BK7 Glass" by Hiro Zhenguang et al.

Example II provides the specifications and relevant data for compensating lens design for general aspherical surface as noted therein.

EXAMPLE II

TESTING OF GENERAL ASPHERICAL SURFACE AND SPECIFICATION OF COMPENSATING LENS

R = −114.176", higher order aspheric
Constants:
$z = ax^2 + bx^4 + cx^6 + dx^8$
a = 2.1848, E = −7;
b = −8.0289, E = −11;
c = 8.6477, E = −14; and
d = −4.0841, E = −17.

Note: The compensating lens is designed for the best fit hyperbola of the general aspheric surface which is calculated to be R = 114.2", k = −2.25.

Example III provides the specifications and relevant data for compensating lens design for the best fit hyperbola as a single meniscus lens.

EXAMPLE III

COMPENSATING LENS AS A SINGLE MENISCUS DESIGN: SPECIFICATIONS AND DATA FOR BEST FIT HYPERBOLA SURFACE

| | | |
|---|---|---|
| R1 = 3.626" | | |
| | d1 = 0.710 | BK7 diameter = 5.5" |
| R2 = 5.205 | | |

Figure 3:
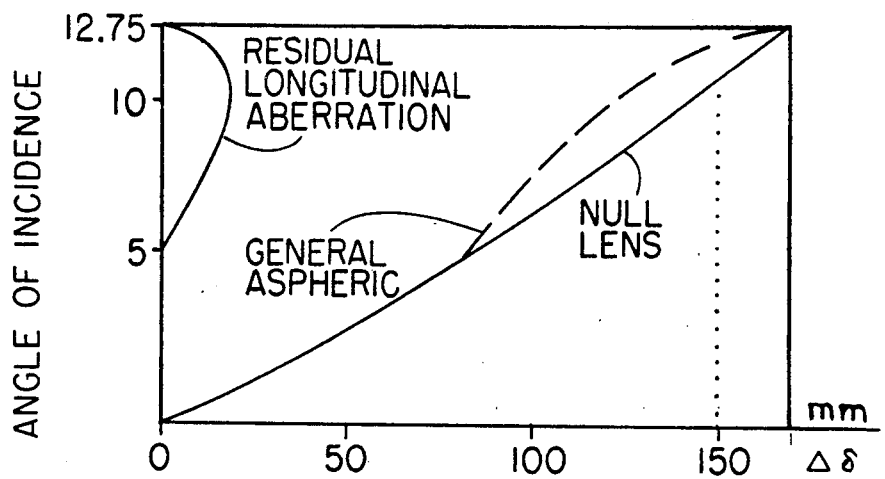
FIG. 3 depicts residual longitudinal aberration to be compensated by computer generated hologram.

Note: The residual longitudinal aberration which is compensated by hologram 30 is shown in FIG. 3.

Figure 4:
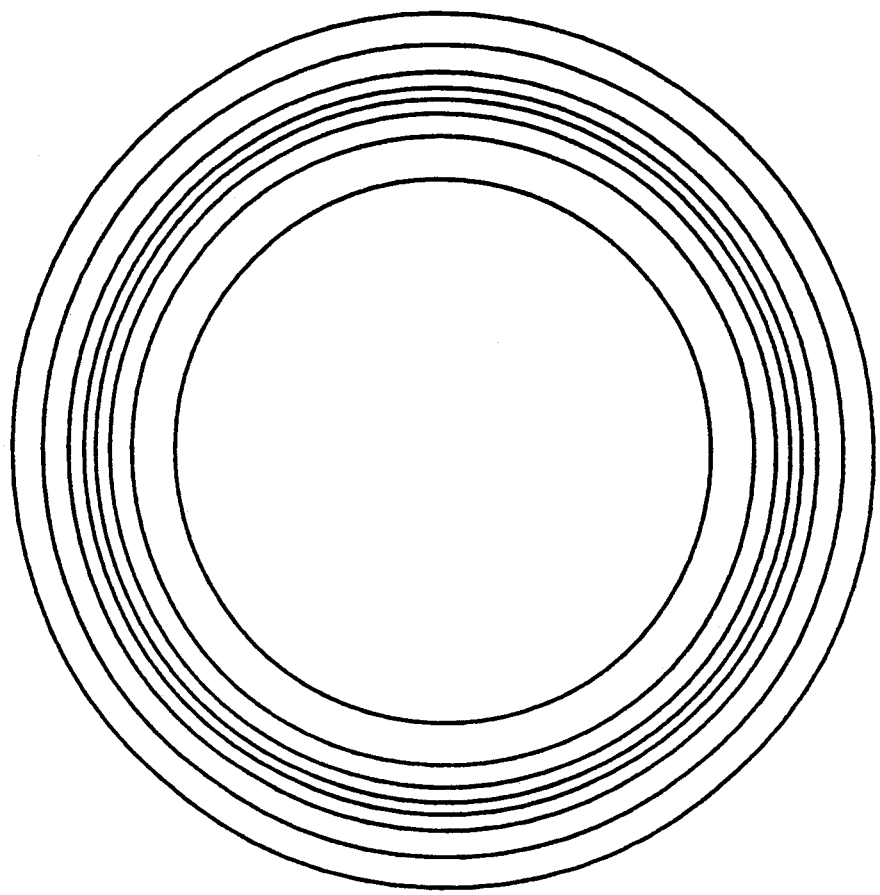
FIG. 4 depicts a view of a computer generated holography 0 order along lines 4—4 of FIG. 1.

In further reference to FIG. 4, the computer generated hologram is variable spatial frequency concentric circles. The maximum spatial frequency to produce 40 lines/mm is easily made by employing standard electron beam lithography technic.

I claim:
1. A testing device for testing aspherical optical and general aspherical optical surfaces, said testing device comprising:
(i) a collimator lens system positioned on an optical path having an optical axis aligned with an illuminating light source of a focused laser beam, said focused laser beam being collimated to a perfectly collimated beam by said collimator lens system having an optical surface of predetermined radius of curvature Rn and having a predetermined distance between optical surfaces of dn, wherein n is a whole integer designation, said perfectly collimated beam being centered along said optical axis through an aberration compensating lens to the surface of a predetermined aspherical optical surface or a general aspherical optical surface under test; and, (ii) said aberration compensating lens having an optical surface of a predetermined radius of curvature $R_n$ and having a predetermined distance between optical surfaces of $d_n$, wherein n is a whole integer designating said optical surface, said aberration compensating lens comprised of all spherical elements designed for best fit to compensate for all aberrations of an aspherical optical surface under test, said aspherical optical surface under test having a conic section in the shape of an ellipse, a parabola, or a hyperbola and said aberration compensating lens comprised of all spherical elements designed for best fit to compensate for all aberrations of a general aspherical optical surface under test except any residual longitudinal aberration which is compensated for by a computer generated holographic general aspheric compensating plate positioned in said perfectly collimated beam between said collimator and said aberration compensating lens.

2. The testing device as defined in claim 1 wherein said collimator lens system is optical grade glass, said collimator lens system further defined by R1 value of 299 mm, d1 value of 11 mm, diameter of 140 mm; R2 value of 242 mm, d2 value of 1 mm, R3 value of 299 mm, d3 value of 11 mm, diameter of 140 mm; R4 is flat, wherein R equals radius of curvature and dn equals distance between optical surfaces measured at center of lens, wherein n is a whole integer, and wherein said collimator lens system has a focal length of 754.7 mm, and a back focal length of 738.23 mm.

3. The testing device as defined in claim 2 wherein said aberration compensating lens is designed with all spherical optical elements consisting of plano convex lens and meniscus lens.

4. The testing device as defined in claim 2 wherein said aberration compensating lens is designed for best fit for said aspherical surface having a conic section in the general shape of a hyperbola.

5. The testing device as defined in claim 4 wherein said aberration compensating lens is designed as a single meniscus lens of optical grade glass, said aberration compensating lens further defined by having a radius of curvature r1 of 3.626 inches, a radius of curvature r2 of 5.205 inches, wherein the distance d1 value of 0.710 inches, wherein said meniscus lens has a diameter of 5.5 inches; and wherein said general aspherical optical surface under test has a radius −114.176 inches and higher order aspheric constants as follows:

| $a = 2.1848\ E - 7;$ | $b = -8.0289\ E - 11;$ |
|---|---|
| $c = 8.6477\ E - 14;$ | $d = -4.0841\ E - 17;$ | and wherein a computer generated holographic general aspheric compensating plate of 0 order, is positioned in said collimated beam between said collimator, lens system and said aberration compensating lens, said computer generated holographic general aspheric compensating plate being of a variable spatial frequency concentric circles with a maximum spacial frequency of 40 lines per mm, said computer generated holographic general aspheric compensating plate compensating of any residual longitudinal aberration of said general aspherical optical surface under test.

* * * * *